(12) United States Patent
Gilbertson et al.

(10) Patent No.: US 9,478,081 B2
(45) Date of Patent: Oct. 25, 2016

(54) CURRENCY KEEPER

(71) Applicant: 3-East, LLC, Coatesville, PA (US)

(72) Inventors: Matthew Gilbertson, Downingtown, PA (US); Timothy Freese, Coatesville, PA (US)

(73) Assignee: 3-EAST, LLC, Coatesville, PA (US)

( * ) Notice: Subject to any disclaimer, the term of this patent is extended or adjusted under 35 U.S.C. 154(b) by 0 days.

(21) Appl. No.: 14/506,019

(22) Filed: Oct. 3, 2014

(65) Prior Publication Data

US 2015/0021393 A1    Jan. 22, 2015

Related U.S. Application Data

(63) Continuation of application No. 13/274,861, filed on Oct. 17, 2011.

(60) Provisional application No. 61/393,442, filed on Oct. 15, 2010.

(51) Int. Cl.
| | |
|---|---|
| G06F 3/045 | (2006.01) |
| G07C 9/00 | (2006.01) |
| E05G 1/00 | (2006.01) |
| E05G 1/04 | (2006.01) |
| G06K 5/00 | (2006.01) |
| G07G 1/14 | (2006.01) |
| E05F 15/00 | (2015.01) |

(52) U.S. Cl.
CPC ............ *G07C 9/00031* (2013.01); *E05G 1/00* (2013.01); *E05G 1/04* (2013.01); *G06K 5/00* (2013.01); *G07C 9/0069* (2013.01); *G07C 9/00912* (2013.01); *G07G 1/14* (2013.01); *E05F 15/00* (2013.01); *E05Y 2400/81* (2013.01)

(58) Field of Classification Search
CPC . G07G 1/14; E05Y 2400/61; E05Y 2400/81; E05F 15/00
USPC .......................................... 257/379; 345/174
See application file for complete search history.

(56) References Cited

U.S. PATENT DOCUMENTS

| | | | |
|---|---|---|---|
| 8,033,375 B2 * | 10/2011 | Doran et al. ................... | 194/217 |
| 2002/0074393 A1 * | 6/2002 | Anderson et al. ............. | 235/379 |
| 2009/0174664 A1 * | 7/2009 | Han .............................. | 345/168 |
| 2011/0316997 A1 * | 12/2011 | Shirbabadi ..................... | 348/78 |

* cited by examiner

*Primary Examiner* — Towfiq Elahi
(74) *Attorney, Agent, or Firm* — Frank J. Bonini, Jr.; John F. A. Earley, III; Harding, Earley, Follmer & Frailey, P.C.

(57) ABSTRACT

An electronic safe which incorporates consumer programmable buttons, along with an on-board central processing unit.

3 Claims, 4 Drawing Sheets

CURRENCY KEEPER

CROSS-REFERENCE TO RELATED PATENT APPLICATION

This patent application is a 35 U.S.C. 120 continuation of U.S. Ser. No. 13/274,861 entitled "Currency Keeper". This application claims the benefit, under 35 USC 119 and 120, of the priority of U.S. Ser. No. 61/393,442 for "Currency Keeper", filed 15 Oct. 2010.

BACKGROUND OF THE INVENTION

1. Field of the Invention

This invention relates to electronic safes and an advantageous and simplified design for use of the electronic features thereof, known as a currency keeper.

2. Description of the Prior Art

The electronic safe, often used for small businesses such as convenience stores where a significant portion of the payments are made in cash, provides a means to secure excess sums of cash.

These electronic safes may have one or more bill acceptors that can determine the denomination of bills as they are inserted into the bill acceptors and store those bills in cash cassettes inside the safe. Such electronic safes may also contain a deposit slot to allow envelopes or other payment methods (checks, credit card slips, travelers checks, etc.) to be inserted and securely stored. Use of the bill acceptors to recognize bills also allows the reporting and tracking of cash deposited in the safe.

The electronic safe is able to provide electronic reports detailing entry of cash, person depositing the cash, time of the deposit of the cash into the safe and details of the denomination of the bills. These reports can also be transmitted to a financial institution or 3$^{rd}$ party service.

Traditionally, electronic safes must be placed in close proximity to a point-of-sale system (such as an electronic cash register system) or a dedicated computer with monitor and keyboard, either of which interfaces with the electronic safe and requires direct cabling. The electronic safe is "instructed" by use of the point-of-sale system or computer system.

Another embodiment of the electronic safe is use of a 10-key pad (with numbers 0 through 9) placed directly on the safe, which connects to the aforementioned dedicated computer. The safe can be instructed via use of this 10-digit key pad.

Any of the above interfaces for instructing the safe and/or extracting information from the safe are expensive systems that must be periodically maintained and/or replaced as the items can wear out and/or become obsolete.

Traditional electronic safes also include a locking mechanism which require a special key. This requires that a manager with a key be on premises at all times to facilitate cash pick-ups and access to the safe.

SUMMARY OF THE INVENTION

This invention provide a substantial improvement to the ease and use of an electronic safe by introduction of buttons on the face of the safe which are consumer programmable to identify a person, indicate an upcoming action or request a report.

The buttons interface with a central processing unit (CPU) located inside of the electronic safe. The CPU is a standalone unit which can transmit data either via hard wire or via wireless signal to an existing computer, smart phone and/or a financial institution.

DESCRIPTION OF THE PREFERRED EMBODIMENTS AND BEST MODE KNOWN FOR PRACTICE OF THE INVENTION

Figure 1:
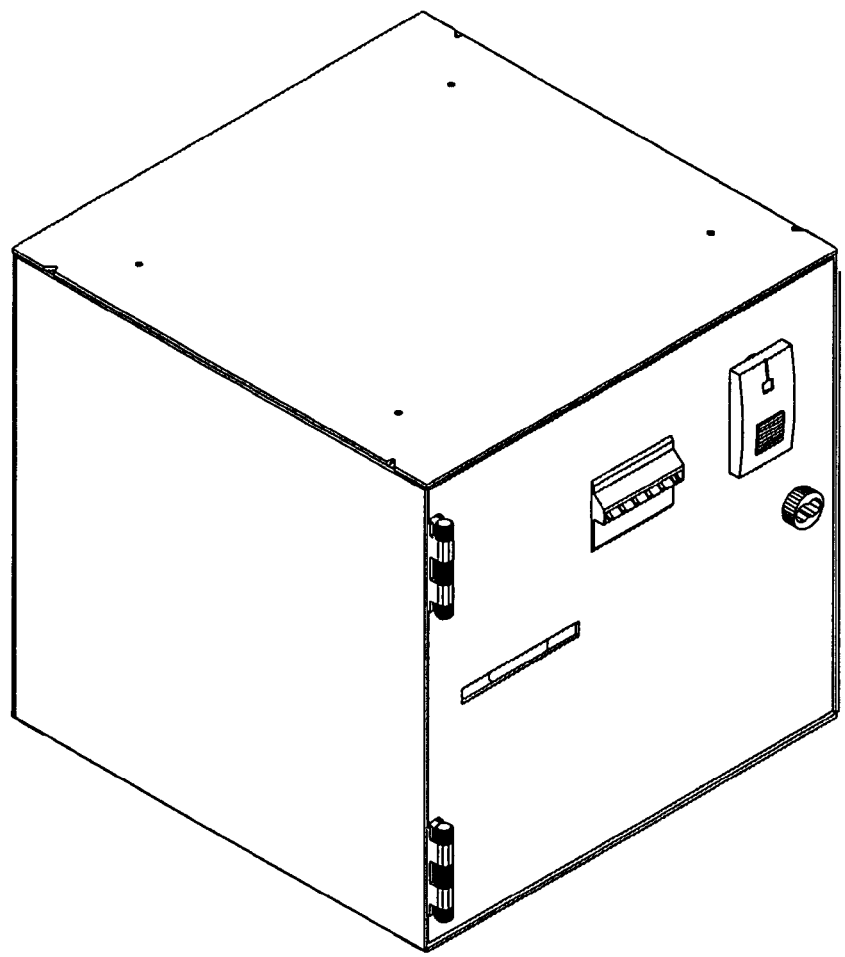
FIG. 1 depicts an electronic safe as known in the art.
Figure 2:
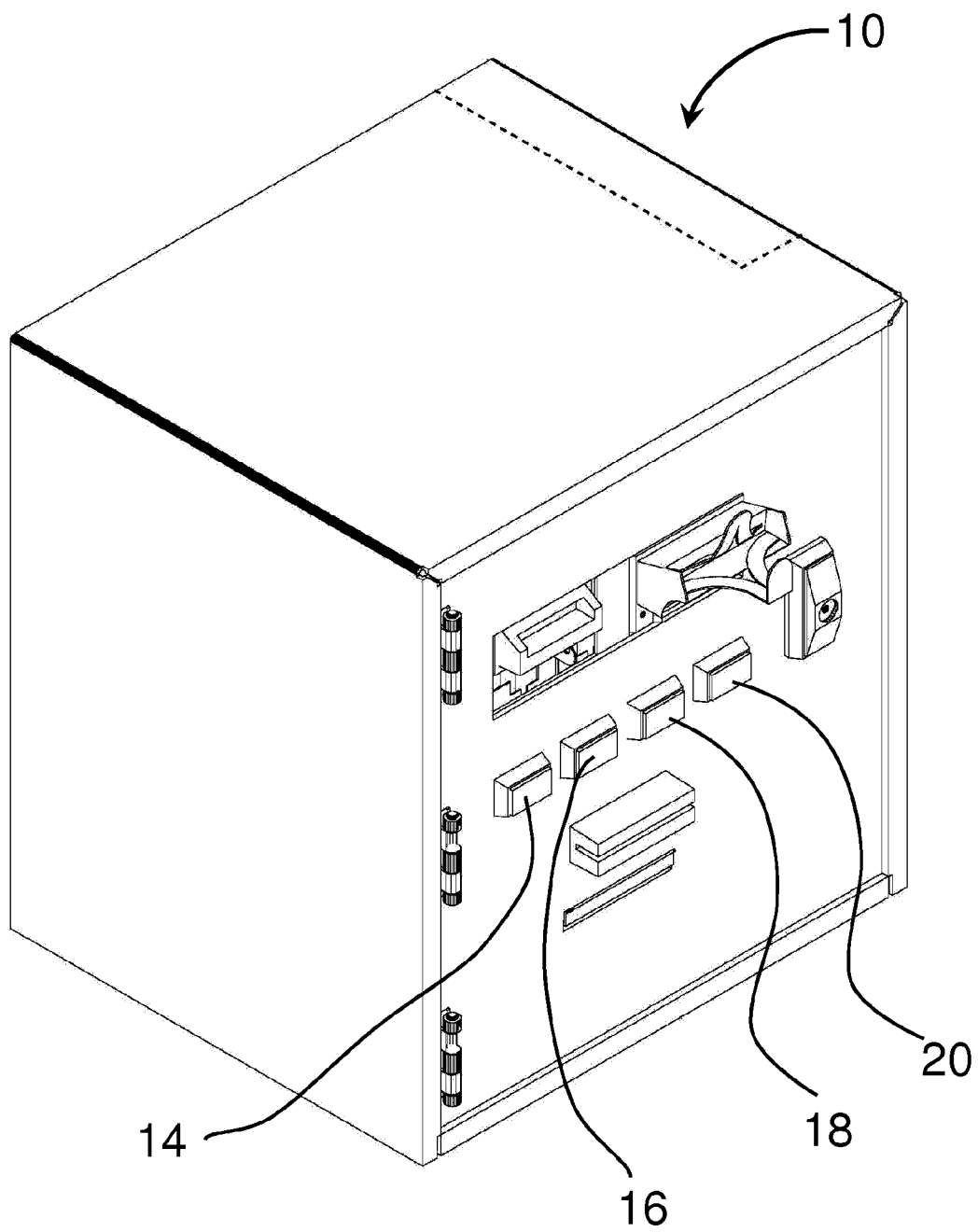
FIG. 2 illustrates the currency keeper of the present invention.
Figure 3:
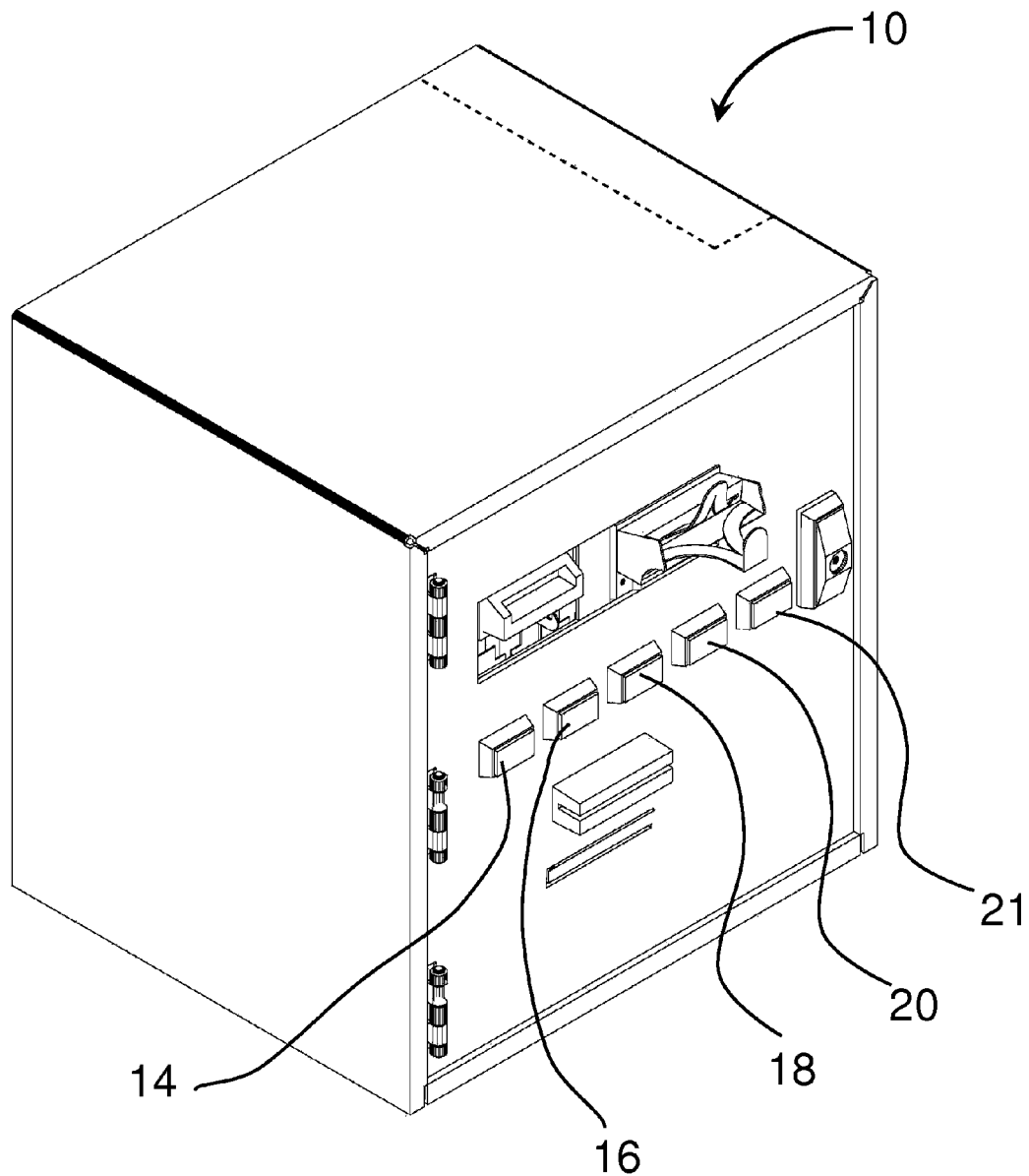
FIG. 3 illustrates an alternative embodiment of the currency keeper of the present invention.
Figure 4:
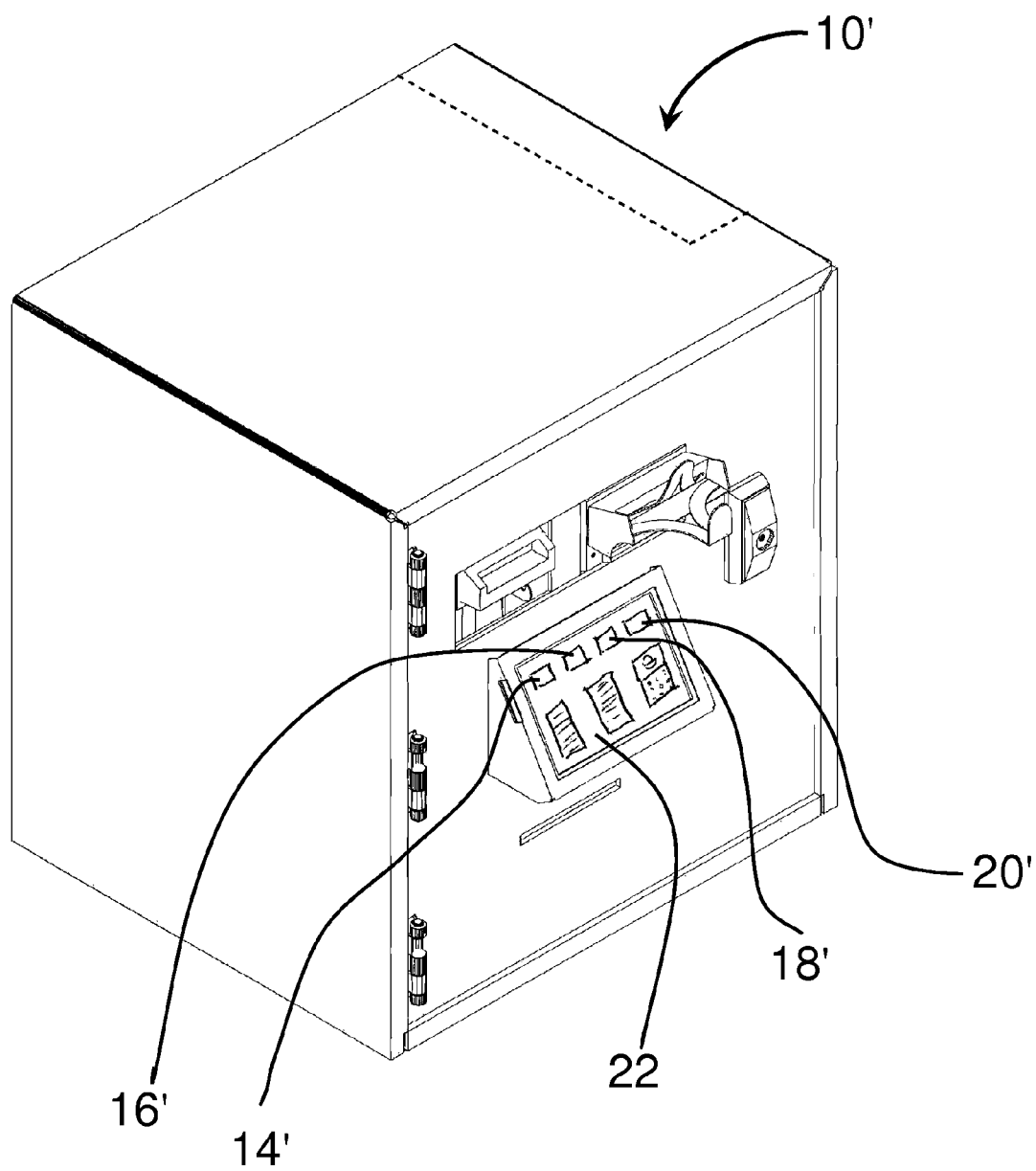
FIG. 4 illustrates an alternative embodiment of the currency keeper of the present invention wherein the buttons are virtual and operated through means of a touch-screen.

The currency keeper 10 of the preferred embodiment, referring generally to FIGS. 2 through 4, includes programmable buttons 14, 16, 18, 20, preferably one each in a different color. These buttons can be programmed to identify a person, indicate an upcoming action or request a report. These buttons can also be coupled with an industry standard card reader 12 and swipe cards to indicate beginning and end of a transaction.

The transaction can be initiated by use of a single button punch, for instance, to indicate an operator. And then, a combination button punch to indicate cash will be fed in. A further button punch or combination button punch might instruct the on-board central processing unit to report the addition of cash to the indicated financial institution.

Additional examples of programmable transactions are as follows:
Single button press—each button is assignable to an individual employee
  Starts and ends a transaction
  Combination Presses (No Card Swipe)
  Press red button 14 and white button 16: Initiates a shift-change
    Press additional button—closes shift on that button
  Button Press While Swiping a Management Card
  White Button 16—performs shift change
  Blue Button 18—performs day end
  White and Blue Buttons 16, 18—remotely updates the software
  Red and Blue Buttons 14, 18—Prints current day inventory
  Red and Green Buttons 14, 20—Restarts the device
  Button Press While Swiping a Reconciliation Card
  Green Button 20—initiates a reconcilement
  Button Press While Swiping a Transaction Card
  Red Button 14—prints a user journal
  Button Press While swiping a Maintenance Card
  Blue Button 18—places device in maintenance mode
In a further preferred embodiment of the invention illustrated in FIG. 4, the buttons 14', 16', 18', 20' are virtual and displayed on a touch screen 22.

The following is claimed:

1. An electronic safe for receiving, holding and accounting for cash input in the form of notes, comprising: a) a free standing cubical container having a door defining one side of the cube; b) four rectangular programmable push buttons mounted in the door and arranged in a single horizontal array, each button being of a different color from the remaining buttons, each button having vertical and horizontal edges, each button being twice as wide as it is high, the upper and lower horizontal edges of respective buttons being aligned, for indicating operator identity, an upcoming action or to request a report according to the programming applied in advance to a central processing unit; c) the central processing unit (CPU) being within the cubical container and connected to the buttons for collecting information from the buttons and conveying such information optionally via hard wire or wireless signal, the central processing unit being programmable to receive and process signals from a actuation of a single one of the pushbuttons or signals received from multiple ones of the pushbuttons contemporaneously; d) a note acceptor mounted in the door and positioned for insertion of notes into the container with the leading edge of the notes being inserted being horizontal, parallel with and above the horizontal array of programmable push buttons; e) a horizontal deposit slot mounted in the door, horizontally aligned with the note acceptor and positioned above the horizontal array of programmable push buttons; f) a card reader mounted in the door below the push buttons and positioned for reading a card swiped though a horizontally oriented slot; and g) a locking device for securing the hinged door in a closed position thereby defining the cubical shape of the container;

wherein at least a plurality of the rectangular programmable pushbutton buttons are programmed so that each button indicated an operator identity;

wherein a single button punch of one of said rectangular programmable pushbutton buttons indicates an operator;

wherein at least some of said rectangular programmable pushbutton buttons are programmed so that a combination of buttons allows cash to be fed into the safe;

wherein a combined punch of a combination of said buttons actuates the safe to receive cash;

wherein said card reader is coupled with said rectangular programmable buttons to indicate the beginning of a transaction, and wherein said transaction comprises actuating the safe to receive cash;

wherein said card reader is coupled with said rectangular programmable buttons to indicate the beginning of a transaction, and wherein said transaction comprises identifying an operator;

wherein said first transaction is identified from said card reader and punching of a combination of said plurality of programmable pushbuttons, and wherein said first transaction actuates the safe to receive cash;

wherein a second transaction is identified from said card reader and punching of one of a plurality of programmable pushbuttons, and wherein said second transaction identifies the operator;

wherein said buttons are programmed to identify and distinguish between management and employees based on the card swipe, wherein at least some of said rectangular programmable pushbutton buttons are programmed so that a first combination of buttons punched together performs a management operation;

wherein said management operation comprises an operation selected from the group consisting of: printing of a report, remotely updating the software; restarting the safe;

wherein at least some of said rectangular programmable pushbutton buttons are programmed so that when a management swipe card is read by said card reader and one of said plurality of rectangular programmable pushbutton buttons is pushed a management operation is performed; and wherein said card reader is coupled with said rectangular programmable buttons to further indicate a transaction that comprises initiating a reconcilement, printing of a user journal, or placing the device in a maintenance mode.

2. The electronic safe of claim 1, wherein at least a plurality of the four rectangular programmable pushbutton buttons are programmed so that each button indicates an operator identity.

3. The electronic safe of claim 1, wherein the four rectangular programmable pushbutton buttons are programmed so that each button indicates an operator identity.

\* \* \* \* \*